(12) United States Patent
Francis

(10) Patent No.: US 6,525,881 B2
(45) Date of Patent: Feb. 25, 2003

(54) OPTICAL FILTERS DERIVED FROM SPHERICAL LENSES AND METHOD OF FABRICATION THEREOF

(75) Inventor: Kurt R. Francis, Yuma, AZ (US)

(73) Assignee: Nexfon Corporation, Fremont, CA (US)

(*) Notice: Subject to any disclaimer, the term of this patent is extended or adjusted under 35 U.S.C. 154(b) by 142 days.

(21) Appl. No.: 09/798,070

(22) Filed: Mar. 5, 2001

(65) Prior Publication Data

US 2002/0122261 A1 Sep. 5, 2002

(51) Int. Cl.[7] .................................................. G02B 1/10
(52) U.S. Cl. ........................ 359/581; 359/664; 359/722; 359/723
(58) Field of Search .............................. 359/642, 581, 359/588, 589, 664, 722, 723, 580; 385/33, 35

(56) References Cited

U.S. PATENT DOCUMENTS 4,592,619 A * 6/1986 Weidel ........................ 385/14
5,790,315 A * 8/1998 Fujinoki et al. ............ 359/652

FOREIGN PATENT DOCUMENTS

JP          5-100160 A  * 4/1993  .................. 359/664

* cited by examiner

Primary Examiner—Evelyn A Lester
(74) Attorney, Agent, or Firm—Leonard Tachner

(57) ABSTRACT

An optical filtering element with minimized edge effects, larger clear center aperture, and thermally stable bonding area. The element consists of a modified ball lens. The glass material that comprises the ball lens can be selected from a variety of thermally matched glass specific to the intended application such as BK7, $SiO_2$, et cetera. The lens is polished on two sides so that the polished surfaces are nearly parallel. The polished ball lens(es) are then loaded into a coating fixture and then into a coating chamber. Multiple dielectric layers are applied to one of the polished surfaces, creating a spectral modifying filter. The other side is coated with an anti-reflection coating (some applications do not require the anti-reflection coating). At the completion of the coating run, the now polished and coated ball lenses can be spectrally measured and binned for use.

10 Claims, 3 Drawing Sheets

OPTICAL FILTERS DERIVED FROM SPHERICAL LENSES AND METHOD OF FABRICATION THEREOF

BACKGROUND OF THE INVENTION

1. Field of the Invention

The present invention relates to filters employed in optical communication systems, and more particularly, to dielectric multi-layer interference filters for optical communication systems.

2. Background Art

Multiple-port, filtering and isolating packages are widely used in local and long distance optical telecommunication networks. These networks comprise various spectral shaping and isolating optical filter assemblies as parts of dense wavelength division multiplexing (DWDM) systems. There is an important need to design reliable filters for such systems, which are subject to various thermal and mechanical loads during their 20 to 25 year lifetime. A typical filter manufacturing process consists of polishing a glass substrate to a specific thickness, cleaning it, placing it into a dielectric substrate coating chamber, applying layers of various materials via an e-beam or ion beam assisted sputtering process or equivalent, removing it from the chamber, cutting or dicing to a desired size, then individually measuring to select the diced filters according to desired optical performance. The number of layers applied during the coating process varies depending on the desired optical performance. Layers are "stacked" or alternated based on the type of material being used. Each layer has different expansion qualities relative to the neighboring/contiguous layers. These differences, coupled with the environment in the coating chamber, yields a significant amount of filter stress, i.e., the individual layers expand or contract differently than the adjacent layer(s). This becomes an issue when the substrate is diced for final filter size requirements. The filter stress across the round coating substrates is altered significantly when small square filters are cut from them. By introducing sharp corners, the filter stress is effectively focused in the corners.

This stress focusing changes the optical performance of the filter element. The net result is that the usable filter region is reduced. This is a significant problem when trying to minimize filter size and package the filters in an optical device with a collimated light beam size that needs to be located in the correct area of the filter. The light beams and a majority of elements in common filter packages have a circular cross section. Holding the square filter in a round package offers two specific challenges: (1) Packaging the filter without inducing more stress to the films or substrates; (2) locating the optimal location for the collimated light beam.

There are two different technical solutions used in the design of bonds securing the components of a filter assembly. A low compliance bond between thermally well-matched glass components is an approach commonly used by a majority of manufacturers. The adhesives used are heat-curable epoxies with high Young's modulus (E>10,000 psi) and moderate to high thermal expansion coefficients ($\alpha$=40 to 60 $10^{-6\circ}$ $C.^{-1}$). A typical example is 353ND Epo-Tek epoxy adhesive. In addition, the bond thickness used is very small.

Silicon adhesives are used to bond thermally mismatched elements and glass filters with metal holders. In these joints, a high compliance design is used. The silicones, which can be cured between 20–150° C. in the presence of moisture, are typically characterized by an extremely low Young's Modulus (E<500 psi) and high thermal expansion ($\alpha$=180 to 250 $10^{-6\circ}$ $C.^{-1}$). A typical example is DC 577 silicone, which can be used to bond a metal filter holder to a filter.

Adhesive bonding with subsequent soldering or welding is required to encapsulate a filtering assembly into a three-port package or DWDM device. A precise alignment achieved during initial assembly of a filter prior to final packaging, can be easily diminished or ruined due to the high temperature thermal cycle associated with soldering or welding during packaging of the component. Such prior art manufacturing processes and resulting components have several problems resulting from the fact that the optical components experience stresses due to the thermal contraction mismatch between the glass and metal materials; polymerization shrinkage in adhesive bonds; and structural constraints induced by bonding and final soldering during encapsulation. These stresses lead to displacements of optical components during bonding and soldering, resulting in 0.3 to 1.0 dB increase in insertion loss.

Such a filter package enclosure, which is typically formed of six to eight concentric proactive units, has micron transverse tolerances. Maintaining these tolerances requires precision machining, time-consuming alignment, and soldering with frequent rework. As a result of these limitations, the optical performance specifications are lowered and cost is increased. As an example, soldering typically includes several re-flow cycles. This induces local thermal stresses in the nearby adhesive bonds and leads to the degradation of the polymer adhesive, resulting in repositioning of optical components and a shift in the spectral filter performance. With such designs, soldering may also result in the contamination of optical components through direct contact with molten solder and/or flux.

Although the collimating subassemblies and housings are cylinders, the alignment of commercially available optical components, which exhibit a random distribution of optical and structural characteristics, requires some lateral and angular repositioning of the subassemblies. This repositioning of the optical subassemblies is limited by the gap in the solder joint and the ratio of this gap to the length of the subassembly. The lateral and angular repositioning observed in some isolators can be as high as 0.05 to 0.3 mm and 0.5 to 1.5° respectively. The soldering of non-capillary gaps produces well-known difficulties, such as high volume shrinkage of the solder, void formation, and contamination of optical components.

However, for many applications, it is desirable to obtain a high accuracy thermally compensated filtering or isolating package that can be relatively inexpensive and reliable. Additionally, a package design should be adequate not only to mechanically protect the fragile optical components, but also to compensate for and minimize the thermally induced shift in spectral performance. Thus, there exists a need for a process for manufacturing a filter (or isolating) element which is miniaturized, has a low insertion loss, is inexpensive to manufacture, which results in a filter having low stress effects, and is reliable, and yields long-term operation.

SUMMARY OF THE INVENTION

The present invention comprises an optical filtering element with minimized edge effects, larger clear center aperture, and thermally stable bonding area. The element consists of a modified ball lens. The glass material that comprises the ball lens can be selected from a variety of thermally matched glass specific to the intended application such as BK7, $SiO_2$, et cetera. The lens is polished on two sides so that the polished surfaces are nearly parallel. The polished ball lens(es) are then loaded into a coating fixture and then into a coating chamber. Multiple dielectric layers are applied to one of the polished surfaces, creating a spectral modifying filter. The other side is coated with an anti-reflection coating (some applications do not require the anti-reflection coating). At the completion of the coating run, the now polished and coated ball lenses can be spectrally measured and binned for use.

The polished ball lens filter is a significant improvement over the current square filter. There are no dicing (cutting) induced edge effects. This allows for a more thermally stable filter, avoids chipping of corners due to dicing, and maximizes the usable filter area in a cylindrical package. The outer diameter of the polished and coated ball lens provides a circular, smooth surface that can be used for bonding and alignment, with no risk of epoxy in the optical path. Additionally the spherical shape of these filter elements allows for angular alignment of the filter surface with no change in bond line configuration. Because of this, adhesives that would normally be rejected for use with the square filters can be considered for use with the spherically shaped filter because the bond lines will remain uniform through any angular alignments.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
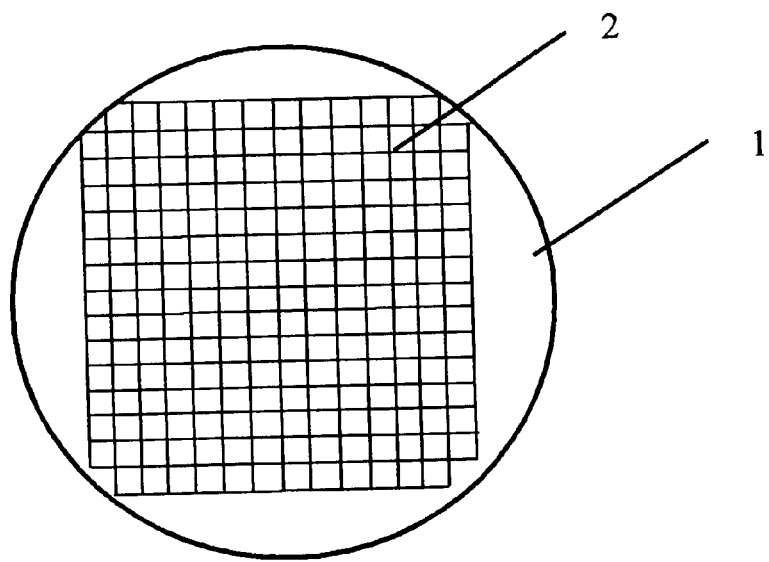
FIG. 1 is a simplified view of an example of a glass substrate and dicing pattern used in prior art optical filter fabrication.

Referring first to prior art FIGS. 1–4, it will be seen that a prior art rectangular filter element 3 is made from a substrate 1 that has been cut or diced into an array 2 of elements. Each element 3 has its own underlying substrate base 4 coated with several layers 5 of selected film materials.

Figure 2:
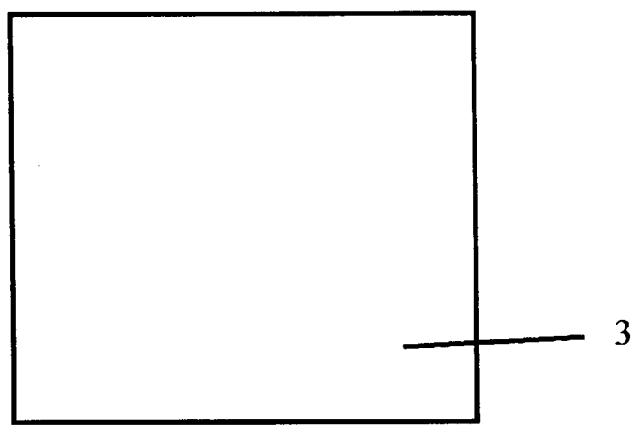
FIG. 2 is a top view of a diced prior art filter element fabricated in accordance with the substrate process illustrated in FIG. 1.
Figure 3:
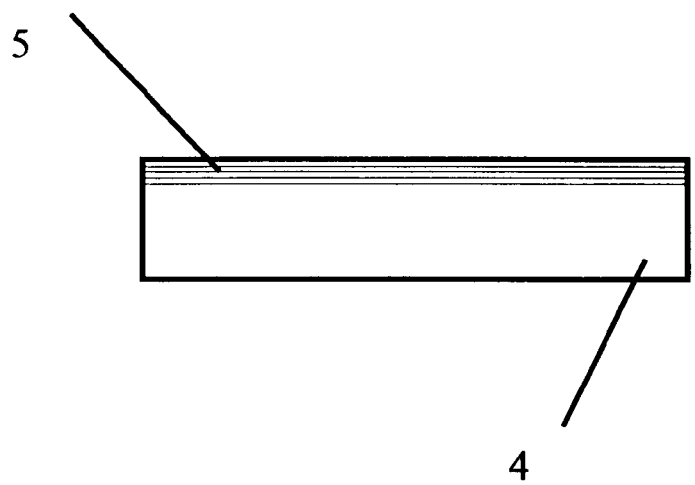
FIG. 3 is a side view of the filter element of FIG. 2.
Figure 4:
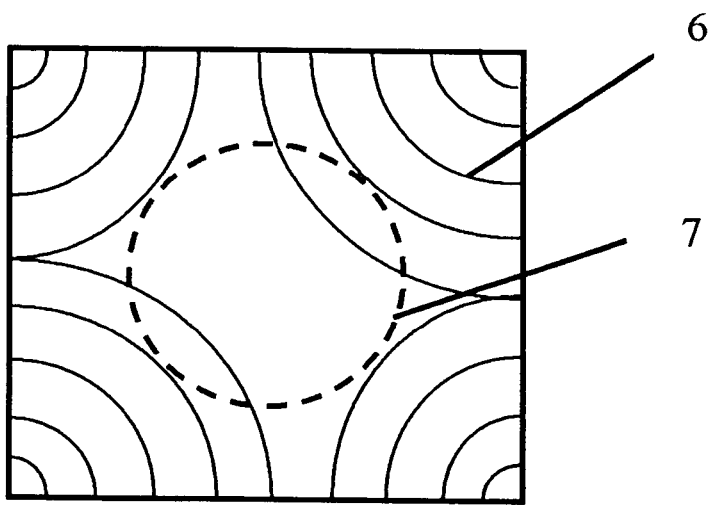
FIG. 4 is a view similar to that of FIG. 2, but showing the stress edge effects of that diced prior art filter element.

A typical filter manufacturing process consists of a glass substrate being polishing to a specific thickness, cleaning, placing into a dielectric substrate coating chamber, applying layers of various materials via an e-beam or ion beam assisted sputtering process or equivalent, removal from chamber, and diced (cut) to the desired size, then individually measured to select the diced filters 2 according to desired optical performance. The number of layers applied during the coating process varies depending on the desired optical performance. Layers are "stacked" or alternated based on the type of material being used. Each layer has different expansion qualities relative to the other layers. This coupled with the environment in the coating chamber yields a significant amount of filter stress, i.e., the individual layers are expanding or contracting differently than the adjacent layer(s). This becomes an issue when the substrate 1 is diced for final filter size requirements (FIGS. 1 and 2). The filter stress across the round coating substrates is altered significantly when small square filters are cut from them. By introducing sharp corners, the filter stress is effectively focused in the corners. This stress focusing changes the optical performance of the filter element (typical filter performance stress lines and are noted in FIG. 3. The net result is that the usable filter region is reduced. This is a significant problem when trying to minimize filter size and package them in an optical device with a collimated light beam size that needs to be located in the correct area of the filter (noted on FIG. 3).

Figure 5:
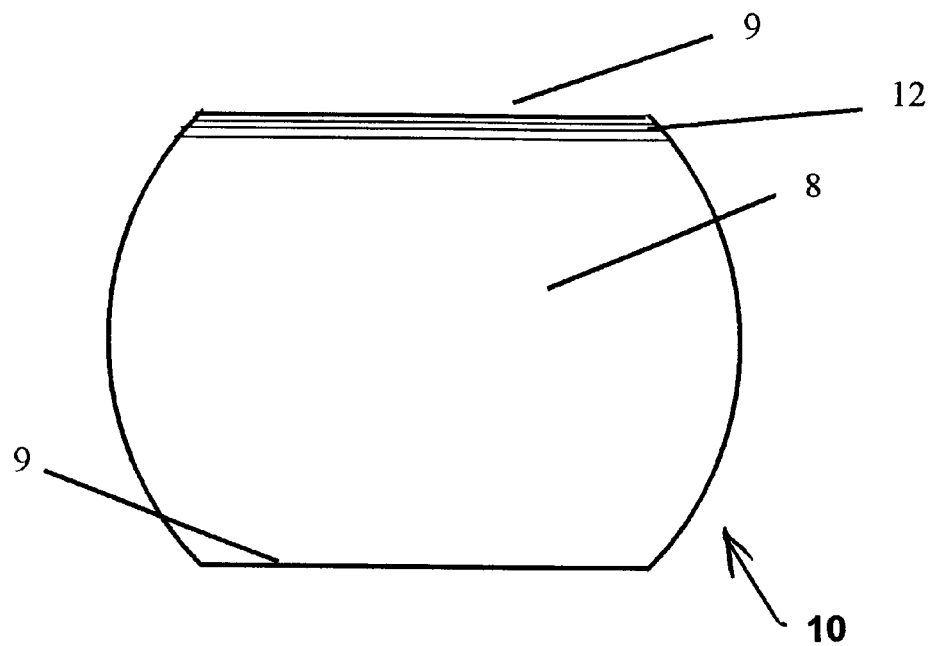
FIG. 5 is a side view of a filter element in accordance with a preferred embodiment of the present invention.
Figure 6:
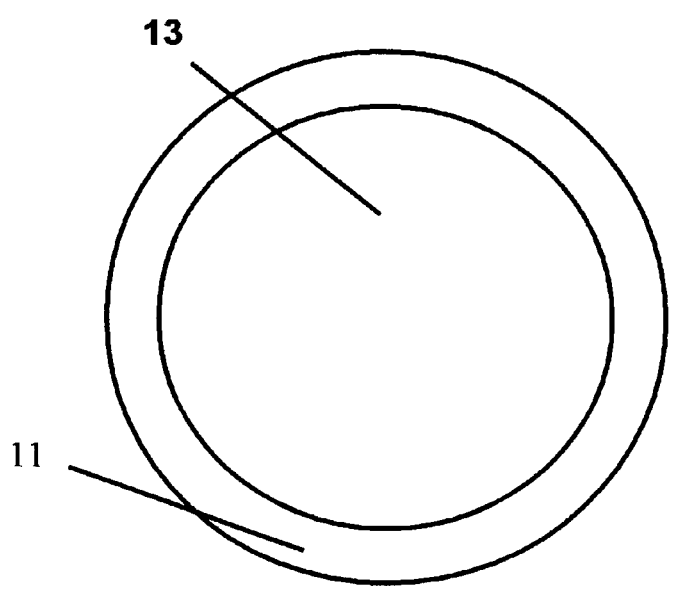
FIG. 6 is a top view of the embodiment of the invention shown in FIG. 5.

Referring now to FIGS. 5 and 6, it will be seen that an optical filtering element in accordance with a preferred embodiment of the invention exhibits minimized edge effects, larger clear center aperture, and a thermally stable bonding area. The element 10 consists of a modified ball lens. The glass material that comprises the ball lens can be any thermally matched glass specific to the intended application (BK7, $SiO_2$, etc.). The lens is polished on two sides 9 so that the polished surfaces are nearly parallel. The polished ball lens(es) 8 are then loaded into the coating fixture and then into a coating chamber. Multiple dielectric layers 12 are applied to one of the polished surfaces 9, creating a spectrally modifying filter, the other side is coated with an anti-reflection coating (some applications do not require the anti-reflection coating). At the completion of the coating run, the now polished and coated ball lenses 8 can be spectrally measured and binned for use.

The polished ball lens filter is a significant improvement over the prior art square filter. First there are no dicing (cutting) induced edge effects. This allows for a more thermally stable filter, avoids chipping of corners due to dicing, and maximizes the usable filter area 13 in a cylindrical package.

Second the outer diameter of the polished and coated ball lens provides a circular, smooth surface 11 that can be used for bonding and alignment, with no risk of epoxy in the optical path. Additionally the spherical shape of these filter elements allows for angular alignment of the filter surface 9 with no change in bond line configuration (no adhesive induced bond wedging). Because of this, adhesives that would normally be rejected for use with the square filters can be considered for use with the spherically shaped filter 10 because the bond lines will remain uniform through any angular alignments.

It will therefore now be observed that the present invention provides a number of significant advantages. These include:

1. Uses the existing coating processes and chambers which permits use of current coating techniques without requiring large capital equipment expenditures;
2. Employs inexpensive elements (ball lenses) which are already produced in large quantities;
3. Increases yields of usable filters (reduced stress effects);
4. Increases reliability of bond lines from spherical bonding surface;
5. Larger filter substrate for improved filter stability;
6. Versatility to control the active filter areas size (polished area);

7. Improves final packaging stabilities; the cylindrical packages are more symmetric about the optical axis than rectangular filter elements.

Based upon the foregoing, it will be understood that the invention has been described herein in the form of a preferred embodiment. However, it should also be understood that variations and additions to that particular embodiment are contemplated. Accordingly, the scope of protection herein is limited not by the particular embodiment disclosed, but only by the appended claims and their equivalents.

What is claimed is:

1. An optical filter device comprising:
   a spherical lens having two, substantially parallel, flattened surfaces forming opposed sides of said lens; at least one of said flattened surfaces being coated with a plurality of selected contiguous dielectric film layers to provide selected optical wavelength filtering.

2. The optical filter device recited in claim 1 wherein said lens comprises an unflattened surface of substantial spherical contour, said unflattened surface providing the bonding portion of said device.

3. The optical filter device recited in claim 1 wherein another of said flattened surfaces is coated with an anti-reflection coating material.

4. An optical filtering element comprising:
   a light transparent material configured as a truncated sphere having at least one flat surface coated by a plurality of dielectric film layers.

5. The optical filtering element recited in claim 4 wherein the remaining round surface of said sphere provides a bonding portion of said filtering element.

6. The optical filtering element recited in claim 4 wherein said sphere has an additional flat surface that is parallel to said at least one flat surface.

7. The optical filtering element recited in claim 6 wherein said additional flat surface is coated with an anti-reflection coating material.

8. The optical filtering element recited in claim 4 wherein said light transparent material comprises glass.

9. A method of fabricating an optical filter; the method comprising the steps of:
   a) providing a sphere made from a light transparent material;
   b) polishing said sphere at two opposed points on the surface of said sphere until two substantially parallel flat surfaces are configured on said sphere; and
   c) coating one said flat surface with a plurality of selected dielectric film layers until light passing through said coated surface has its frequency spectrum altered in a selected way.

10. The method recited in claim 9 further comprising the step of:
   d) coating the other said flat surface with an anti-reflective coating material.

* * * * *